United States Patent

[11] 3,629,545

| [72] | Inventors | Charles Eckner Graham<br>Dover;<br>Robert Miller Lumley, Trenton, both of N.J.; David James Oberholzer, Allentown, Pa. |
|---|---|---|
| [21] | Appl. No. | 691,883 |
| [22] | Filed | Dec. 19, 1967 |
| [45] | Patented | Dec. 21, 1971 |
| [73] | Assignee | Western Electric Company, Incorporated<br>New York, N.Y. |

[54] LASER SUBSTRATE PARTING
14 Claims, 9 Drawing Figs.

[52] U.S. Cl. ................................................. 219/121 L, 219/137
[51] Int. Cl. ...................................................... B23k 9/00
[50] Field of Search ............................................. 219/69, 121 EB, 121 L, 383, 384; 331/94.5; 225/2 T

[56] References Cited

UNITED STATES PATENTS

| 3,112,850 | 12/1963 | Garibotti | 219/121 |
|---|---|---|---|
| 3,293,652 | 12/1966 | Roshon et al. | 219/121 |
| 3,369,101 | 2/1968 | DiCurcio | 219/121 |
| 3,410,979 | 11/1968 | Larsson | 219/121 |

FOREIGN PATENTS

| 1,244,346 | 7/1967 | Germany | 219/121 L |
|---|---|---|---|

OTHER REFERENCES

" Laser Assisted Rock Fracture" by F. J. McGarry et al.; Dept. of Commerce Clearing House P.B. 174245.

Washington Post " Granite Softened by Infrared Laser" Nov. 24, 1966 page D4.

British Journal of Applied Physics; " Laser Damage in Glasses" May 1965 Vol. 16 No. 5 pp. 751

Industrial Laser Applications, by T. A. Osial, Laser Techniques, Oct. 1967 Instruments and Control Systems, Pages 101- 104

*Primary Examiner*—J. V. Truhe
*Assistant Examiner*—Robert E. O'Neill
*Attorneys*—H. J. Winegar, R. P. Miller and W. M. Kain

ABSTRACT: A laser beam is applied to a substrate to separate the substrate at that portion of the substrate to which the laser beam is applied and the laser beam is displaced relative to the substrate to part or separate the substrate along a path defined by such relative displacement. A localized fracture, which extends entirely through the substrate but which is restricted to the portion of the substrate to which the laser beam is applied, may be generated without deleterious damage to the substrate. By displacing the laser beam along a desired path, the fracture is propagated along the desired path to separate or part the substrate.

PATENTED DEC 21 1971

INVENTORS
C. E. GRAHAM
R. M. LUMLEY
D. J. OBERHOLZER

BY W. L. Williamson
ATTORNEY

LASER SUBSTRATE PARTING

BACKGROUND OF THE INVENTION

In the manufacture of thin-film circuits, for example, a plurality of manufacturing processes are generally employed such as material deposition, pattern generation, selective etching, anodizing, etc. As the cost to apply these manufacturing processes simultaneously to a plurality of individual circuits is essentially the same as it is to apply the processes to a single individual circuit, it is common practice to process a plurality of individual circuits on a single substrate as a group. Such group processing permits the manufacture of thin-film circuits with a substantial reduction in the cost of individual circuits. However, after group processing it is essential that the substrate be diced to separate the individual circuits economically and without damage to the circuits.

The technique of group processing is, of course, not restricted to the manufacture of thin-film circuits or components, but is widely employed whenever it is desirable to manufacture a plurality of circuits and/or discrete components on a single substrate. For example, thin-film components such as capacitors and resistors may be advantageously group processed on a single substrate, discrete transistors, diodes, etc. may be advantageously group processed on a single substrate, i.e., silicon or germanium slice, memory devices may be advantageously group processed on a single substrate, and integrated circuits may be advantageously group processed on a single substrate such as a glass, ceramic, quartz or sapphire substrate or such as a germanium or silicon slice. In each case, where group processing is employed, it is essential that the substrate be diced to separate the individual circuits and/or components economically and without damage thereto. As employed herein, the term "substrate" is not restricted to such materials as glass, quartz, sapphire, ceramic, etc., but also includes such materials as silicon and germanium slices, i.e., a suitable material from which circuits and/or discrete components may be formed and/or supported.

The substrate material almost exclusively used in the manufacture of thin-film circuits and components was initially glass due to its availability, desirable properties and low cost. Of course, for the same reasons, glass substrates are still widely used today. Probably as a result, the same techniques employed in the glass-cutting art have been pressed into service for cutting glass substrates. The most common glass-cutting technique is to employ a scribing tool such as a diamond point cutter or a steel wheel to score the glass along the scored line. Anyone who has employed this technique to cut glass will appreciate that due to the unpredictable nature of glass, this technique is not without its difficulties. No matter how carefully glass is scored or how carefully it is stressed, it is not unusual for the glass to fracture along a random path which does not follow the scored line. When this technique is employed to dice glass substrates, an improper fracture usually results in damage to one or more circuits or components and, at the very least, a jagged dangerous edge is produced. In addition to the general unreliability of this technique, scribing tools are subject to excessive wear and must frequently be replaced. For mass production purposes, this technique is expensive as well as generally unreliable.

Scribing techniques have been developed in the glass-cutting art which eliminate the necessity of mechanically scribing the glass. These techniques were developed primarily for cutting relatively thick glass sheets and for cutting the glass sheets into a shaped pattern. These techniques employ one or more heated members to apply a localized thermal shock to the glass sheet to fracture the glass sheet along a desired pattern. U.S. Pat No. 2,169,687 is representative of this technique and discloses the use of a resistance wire which is applied to a glass sheet in a desired pattern. Current is applied to the wire to rapidly heat the wire and apply a thermal shock to the glass sheet along the path of the wire.

Although these techniques may be employed to great advantage when it is desired to cut relatively thick sheets of glass or when it is desire to cut glass sheets in a shaped pattern and although these techniques eliminate the problems of excessive wear to mechanical scribing tools by eliminating the use of such tools, there are still difficulties and special problems encountered in dicing substrates which these techniques do not solve.

These techniques usually require that the glass be stressed to break the glass along the fracture. Due to the general perversity of glass, the glass does always break along the fracture. When this technique is employed to cut a glass sheet into a shaped pattern, this irregular breakage can usually be relied upon to occur on the cullet side of the fracture with no danger to the shaped pattern. However, in dicing substrates there is usually no cullet and the danger of irregular breakage and attendant damage to circuits and/or components renders this technique unreliable for this purpose. A disadvantage of this technique for dicing substrates is that the high currents employed to thermally shock the glass may produce arcing, resulting in damage to the circuits and/or components. Another serious difficulty encountered in employing this technique to dice substrates is that it is necessary to bring a heated member into contact with the substrate thereby introducing the danger of contamination and heat damage to the circuits and/or components. When the circuits and/or components are formed on the substrate in a closely spaced relationship, the danger from contamination, heat damage, and/or electrical arcing is particularly great.

Alternate techniques have been developed in the glass-cutting art for applying a thermal shock to a glass sheet. For example, U.S. Pat. No. 3,215,345 discloses the use of a mechanical member which is cooled by passing a refrigerant through the mechanical member. By applying the mechanical member to a glass sheet, the sheet is fractured by the thermal shock. This technique would not produce electrical arcing if employed to dice substrates, but because mechanical contact is required, contamination of the circuits and/or components could still result. Due to the relatively large size of such a mechanical member, contact with adjacent circuits and/or components would be difficult to avoid. The resulting contamination as well as thermal shock of the circuits and/or components could cause serious damage thereto.

One technique specifically directed to the dicing of a glass substrate applies a radiofrequency signal to a glass substrate so that radiofrequency energy is caused to pass completely through the material to be cut to thermally shock and fracture the glass substrate. The radiofrequency signal effects a localized low-impedance conduction path through the material along the line of travel of the radiofrequency signal and produces a plasma conduction in the form of an arc which extends between a probe which is applying the signal and a plate for holding the glass substrate. The heat thus generated causes a cutting of the material. By displacing the probe across the glass substrate, cutting along the path of travel of the probe is accomplished. Contact of the probe with the glass substrate is employed to achieve a cleaner, faster, more efficient cutting. The difficulty of contamination due to such contact and due to material expelled from the plasma are serious disadvantages to this technique. In addition, arcing of the radiofrequency signal across the circuits and/or components may result in damage thereto.

In summary, the glass-cutting art has not provided a suitable technique for dicing glass substrates either because of the general unreliability of the techniques, the unsuitability thereof for mass production or because of the peculiar problems encountered in dicing substrates.

The difficulties experienced in dicing glass substrates to separate individual circuits are multiplied when ceramic substrates are employed. It is all but impossible to properly score ceramic material with a mechanical-scribing tool, and even if the ceramic material is scored, it is even more unpredictable than glass and almost invariably fractures in an irregular manner. The thermal techniques discussed above for cutting glass have not been applied to ceramic materials and even if they were adaptable to ceramic materials, the same difficulties experienced in dicing glass substrates would be encountered. Electron beam cutting of ceramic substrates has also been employed on an experimental basis, but has proven unsatisfactory. Electron beam devices are extremely expensive and it is necessary to cut the ceramic substrates in a vacuum which adds considerably to the expense of this technique. In addition, cutting through the ceramic material with an electron beam requires the evaporation of the ceramic material along a desired path to separate the ceramic material. This results in a ragged cut with considerable surface damage to the ceramic material, subjects the ceramic material and, therefore, any circuits and/or components thereon to severe thermal shocks, and exposes the circuits and/or components to relatively large amounts of vaporized ceramic material with the accompanying danger of contamination. Consequently, ceramic substrates are commonly diced by cutting the substrates with a diamond saw. However, this technique is expensive, very slow and requires frequent replacement of the diamond saw due to excessive wear.

A relatively new technique for dicing ceramic substrates includes cutting individual substrates from an uncured ceramic sheet and then firing the precut ceramic sheet to rejoin the individual substrates and form a single substrate having prescored lines. However, this technique is not completely reliable as great care must be exercised when the substrate is stressed to separate the individual circuits and/or components so as to avoid random fracturing of the substrate. In addition, care must also be exercised to avoid accidental stressing of the substrate before all of the manufacturing steps have been completed. Great care must also be taken to insure that the individual circuits and/or components are formed on the substrate in proper alignment with the prescored lines. As ceramic materials shrink as much as 15 to 20 percent during firing, the dimensions of such substrates and the position of such prescored lines vary substantially from substrate to substrate making the alignment of the manufacturing processes with the prescored lines most difficult in a mass-manufacturing situation.

An additional disadvantage of most of the previously discussed techniques is that the material must be scribed and then stressed to fracture the material. This requires two distinct steps and doubles the handling requirements for dicing the substrates and therefore increases the cost. For example, in U.S. Pat. No. 3,112,850 a technique is disclosed which employs a high-energy beam such as an electron beam or a laser beam to scribe a semiconductor slice and then stresses the slice to fracture the slice along the scribed lines.

It is, therefore, an object of this invention to provide an improved method for separating or parting substrates.

An additional object of this invention is to provide an improved method for reliably parting substrates along a desired path without deleterious damage to the substrates, without contamination of the substrates, and without the necessity of subsequent mechanical stressing of the substrates to part same.

SUMMARY OF THE INVENTION

With the foregoing objects and others in view, this invention contemplates a method for parting substrates which includes the steps of (1) applying a laser beam to a substrate to separate the substrate and (2) displacing the laser beam relative to the substrate to part or separate the substrate along the path of the laser beam.

DETAILED DESCRIPTION

Prior to a detailed discussion of the method of this invention, a brief description of a suitable device for practicing the method of this invention will be given.

Figure 1:
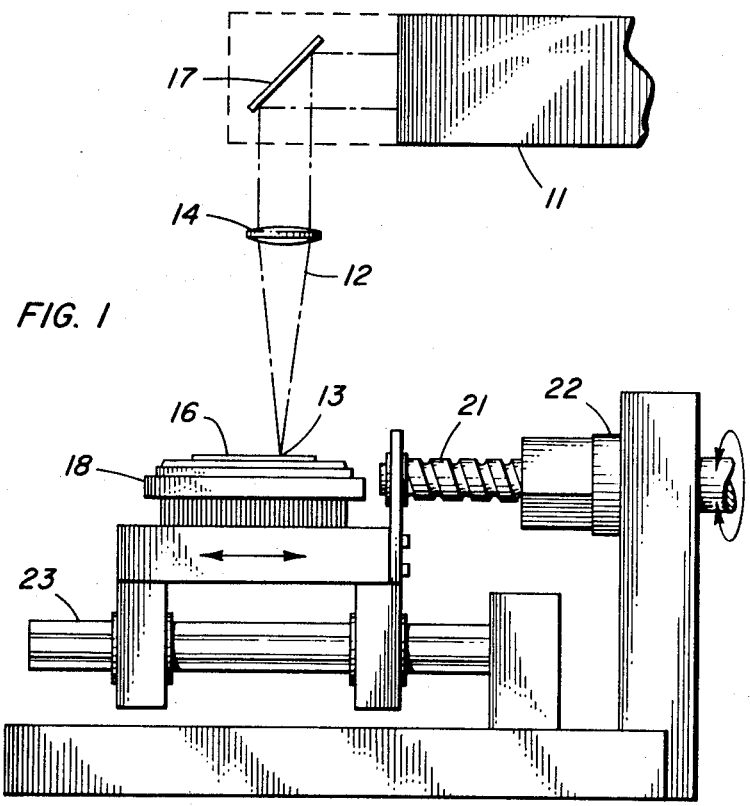
FIG. 1 illustrates a device suitable for the practice of the method of this invention, including a laser and a mechanism for displacing a laser beam relative to a substrate.
Figure 2:
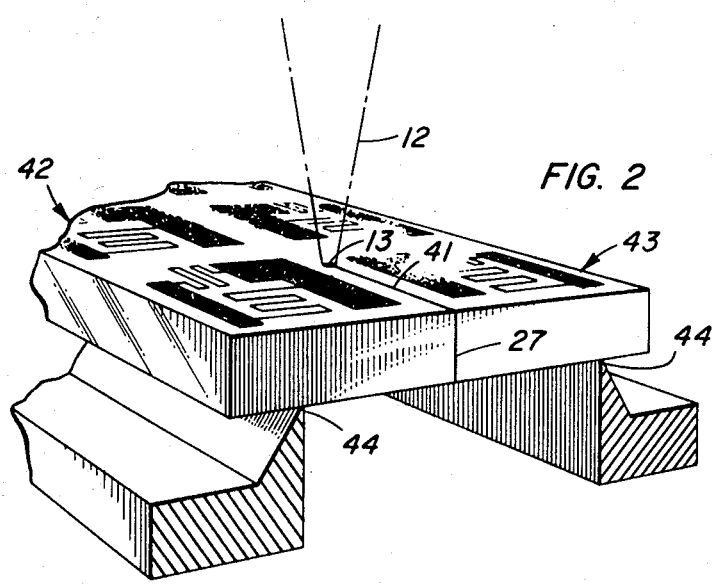
FIG. 2 is an enlarged partial view essentially taken from FIG. 1 which illustrates the displacement of a laser beam across a substrate.
Figure 3:
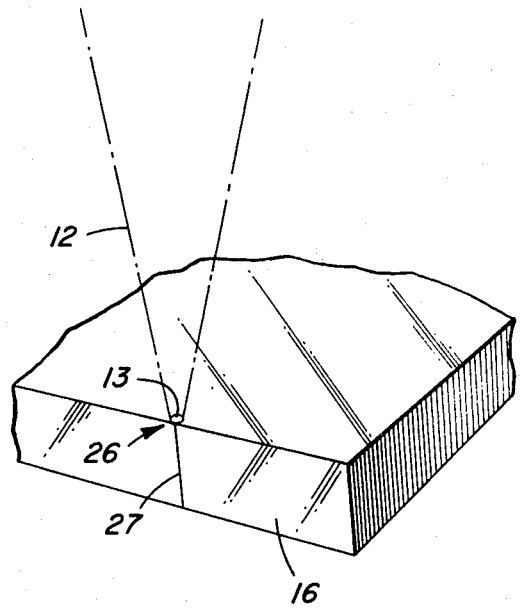
FIG. 3 is an enlarged view essentially taken from FIG. 2 but which specifically illustrates the fracture of a substrate by the method of this invention at an edge of the substrate.

With reference to FIGS. 1-3 of the drawings, a conventional laser 11 such as a Perkin-Elmer molecular gas laser Model No. 6200 may be employed to generate a laser beam 12. This particular laser has a maximum continuous output of approximately 50 watts and generates a laser beam at a wavelength of approximately 10.6 microns. The laser beam generated has a diameter of approximately one-half inch and may be focused to a point or spot 13 with a conventional lens 14. Due to the length of the laser head of this particular laser, the laser beam 12 is emitted generally horizontally and is conveniently deflected onto a workpiece such as substrate 16 by a conventional deflecting device such as a mirror 17.

Displacement of the laser beam 12 relative to the substrate 16 may be advantageously accomplished by positioning substrate 16 on a carriage 18 and approximately rotating a screw 21 in a nut 22 to displace carriage 18 on guide 23. Rotation of a screw 21 may be accomplished in any suitable manner, for example, by a reversible electric motor (not shown) and will result in relative displacement of laser beam 12 to displace the beam across substrate 16 in a straight line.

If it is desired to displace the laser beam 12 relative to the substrate 16 in a more complicated pattern, the carriage 18 may be displaced in any suitable manner. For example, a conventional numerically controlled table having at least 2° of freedom may be employed to displace the laser beam relative to the substrate in any desired pattern. If a simple circular pattern is desired, the carriage may be rotated in a conventional manner with the laser beam positioned a predetermined distance away from the axis of rotation to displace the beam 12 relative to the substrate along a circular path.

The method of this invention includes the steps of (1) applying a laser beam to a substrate and (2) displacing the laser beam relative to the substrate to separate the substrate along the path of the laser beam.

The laser beam may be applied to a predetermined area of a substrate by positioning the substrate 16 in the beam 12 so that the beam 12 strikes a predetermined area 26 (FIG.3) of the substrate 16. When the laser beam 12 is applied to a predetermined area 26 of the substrate 16 at a sufficiently high-power level, a localized fracture 27 (FIG. 3) at area 26 occurs which fracture 27 extends through the entire substrate. The fracture 27 is shown in FIG. 3 at the edge of the substrate to clearly illustrate that the fracture extends through the entire thickness of the substrate. It will be appreciated, however, that the fracture 27 may be generated at any desired area on the substrate.

Although the fracture 27 extends through the entire substrate, it is a localized fracture in that it is substantially restricted to the area 26 which corresponds to the size of the spot 13. It is thought that the local temperature gradient at area 26 produced by the application of laser beam 12 thereto results in sufficient expansion of the substrate at area 26 to cause the localized fracture 27.

The laser beam 12 may be displaced relative to the substrate 16 in any suitable manner as discussed supra. It has been discovered that the local fracture 27 which occurs when the laser beam 12 is applied to a predetermined area 26 propagates along the path of the beam to part the substrate 16 along the path of the beam. For example, as illustrated in FIG.

2, if beam 12 is displaced across substrate 16 along the path defined by line 41, the local fracture 27 will follow line 41 to fracture the substrate 16 through the entire substrate along the line 41. For example, if it is desired to partition or separate the substrate 16 along line 41 to separate circuits 42 from circuits 43, the substrate 16 may be partitioned by displacing the beam 12 along line 41 intermediate circuits 42 and 43. As will be appreciated, the beam 12 may be displaced along any desired path to part the substrate in any desired manner. For example, circular pieces have been cut from substrates and substrates have been parted along tortuous paths such as a sawtooth path. Therefore, by displacing the beam 12 relative to the substrate along a predetermined path, the substrate 16 may be parted in any desired configuration.

It has been discovered that the laser beam 12 may be applied to an area 26 of a substrate at a power level sufficiently high to produce a fracture 27 which extends through the entire thickness of the substrate at area 26 without any damage to the substrate which is deleterious either to the substrate or to circuits and/or components thereon. As employed herein, "deleterious damage" refers to the type of damage which is harmful to the substrate or to circuits and/or components on the substrate. For example, deleterious damage includes crazing of the substrate, random fracturing of the substrate or sufficient evaporation of the substrate to cause harmful deposition of the evaporated material onto circuits and/or components.

Although in some instances deleterious damage does not occur when the laser beam is applied at power levels greatly in excess of the minimum power level required for fracturing of the substrate, it has been discovered that at the minimum power level required for fracturing a substrate fracturing can be accomplished without deleterious damage. This minimum power level required for fracturing a substrate may be determined by applying the laser beam to the substrate and then inspecting the substrate to determine if a fracture has occurred. If a fracture has not occurred, the power level of the laser beam is increased until a fracture does occur, or, if a fracture has occurred, the power level of the laser beam is decreased until a fracture no longer occurs. The laser beam may be sequentially applied to a different area of the substrate for each power level or the laser beam may be sequentially applied to identical substrates for each power level. In this manner, the minimum power level required for the laser beam to fracture the substrate may be determined.

There is, in some instances, a small amount of melting of the substrate due to the application of the laser beam to the substrate. Such melting is not essential to obtaining the desired localized fracture 27 and can usually be eliminated by either slightly reducing the power level of the beam or by defocusing the beam to reduce the power density of the spot 13. Defocusing may be accomplished by displacing the substrate out of the focal plane of the laser beam, e.g., by positioning the substrate a distance away from lens 14 which is either slightly greater than or slightly less than the focal length of the lens.

Figure 4:
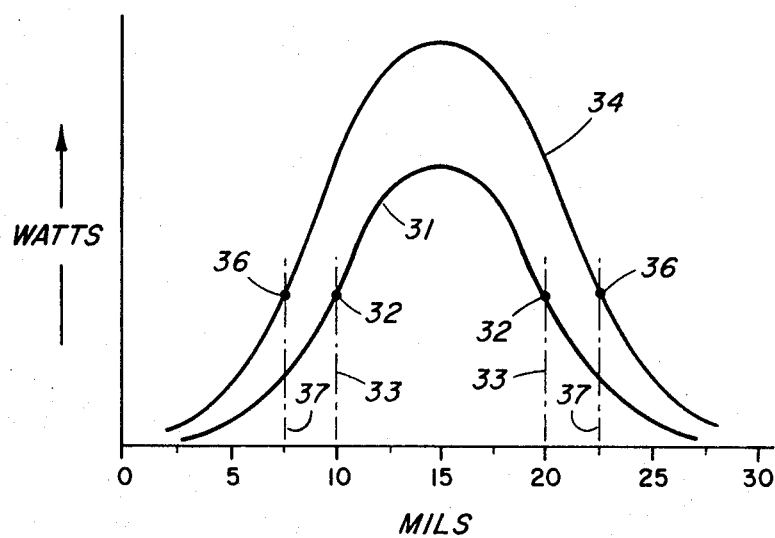
FIG. 4 is a graph of the power distribution across the diameter of the beam spot shown FIG. 2.

Such melting can be tolerated in most situations because it is restricted to a very small area and because no vaporization usually occurs. If vaporization occurs, it is usually desirable to either eliminate the melting or to reduce it to a level where no vaporization occurs so as to avoid damage to circuits and/or components on the substrate due to the random deposition of vaporized material on the substrate. When the substrate is positioned in the focal plane of the laser beam, e.g., a distance away from lens 14 equal to the focal length of the lens, the width of such melting varies from approximately 5 mils to 25 mils. It is observed that the width of the melted area increases with an increase in the power level of the beam even though the substrate is maintained the same distance from the lens 14. With reference to FIG. 4, it is thought that this increase in the width of the melted area may be explained by considering the power distribution across the diameter of the spot 13. If the power level across the diameter of spot 13 is measured, the power level is found to vary across the spot and to have a generally gaussian distribution. In other words, the power level across the spot approximates a generally bell-shaped curve such as curve 31. If a power level indicated by points 32–32 on curve 31 is required to melt a particular substrate at a given rate of displacement, lines 33–33 define the width of the melted area which results upon application of the beam to the substrate. If the power level of the beam 12 is increased, the height of curve 31 is increased, for example, to that of curve 34. The power level on curve 34 required to melt the substrate is indicated by points 36–36, and, as shown by lines 37–37, extends across a greater portion of the spot 13 than when the beam is at the lower power level illustrated by curve 34. Accordingly, with an increase in the power level of the laser beam, an increase in the width of any melted area resulting from the application of the laser beam to the substrate may be expected. In addition, an increase in the power level of the beam is usually accompanied by an increase in the divergence of the beam which tends to increase the size of the spot 13 and, therefore, the width of the melted area. Also, as the rate of displacement of the beam relative to the substrate defines the amount of energy applied to a given area of the substrate within a given time interval, an increase in the rate of displacement tends to reduce the width of the melted area.

It should be noted that although some melting may occur, it is confined to a small area of the substrate and does not deleteriously affect the substrate unless sufficient energy is applied to produce a deleterious amount of vaporization. Controlled fracturing may be accomplished by the method of this invention without observable vaporization of the substrate. It will be appreciated that after the substrate is separated the width of the melted area on each portion of the partitioned substrate is only approximately 2-½ mils to 12-½ mils wide. It is observed that the melted area, when present, extends to a depth of less than 1 mil to approximately 5 mils. Consequently, the melted area is difficult to observe with the naked eye and is not deleterious to the substrate or to circuits and/or components on the substrate.

Specific examples of representative power levels suitable for separating substrates by the method of this invention are given in tables I, II, III and IV. The examples given in table I are for 0.027 inch thick by 4-½ inches long alumina substrates which vary in width from fifteen sixty-fourths inch to 3-½ inches. The examples given in table II are for 1 inch wide by 2 inches long ceramic substrates which are displaced relative to laser beam 12 at a displacement rate of 12 inches per minute. The examples of table II are for five different substrate thicknesses which vary in thickness from 21 mils to 34 mils. The examples given in table III are for 0.047 inch thick by 3 inches long glass substrates which vary in width from ½ inch to 2 inches. The examples given in table IV are for 0.062 inch thick by 3 inches long glass substrates which vary in width by ½ inch to 2 inches. The examples given in table IV are for 0.062 inch thick by 3 inches long glass substrates which vary in width by one-half inch to 2 inches. With the exception of the examples given in table II, representative power levels are given for a plurality of different displacement rates which vary from 6 inches per minute to 60 inches per minute. The power levels in the tables are given in watts and the power levels are given for the beam as it reaches the substrate. These power levels are approximately 20 percent lower than the power level of the beam as it leaves the laser due to the energy loss experienced in the particular optical system employed to deflect and focus the beam onto the substrate. In each of the examples given, the beam is focused to a spot and the substrates are positioned in the focal plane of the beam.

TABLE I

| Displacement Rate | Power Level | | | | |
|---|---|---|---|---|---|
| | 15/64 | 15/32 | 15/16 | 1 7/8 | 3 3/4 |
| 6 | 5.6 | 4.8 | 6.4 | 6.4 | 9.6 |
| 12 | 5.6 | 6.4 | | 10.4 | 21.6 |

| 24 | 8.0 | 8.0 |      | 12.0 | 43.2 |
| 36 | 8.8 | 8.8 | 12.8 | 20.0 |      |
| 48 | 11.2 | 10.4 |    | 27.2 |      |
| 60 | 12.0 | 11.2 | 20.8 | 36.0 |    |

TABLE II

| Thickness | Power Level |
|---|---|
| 21 | 4.8 |
| 23 | 5.6 |
| 25 | 6.4 |
| 31 | 8.8 |
| 34 | 10.4 |

TABLE III

| Displacement Rate | Power Level | | |
|---|---|---|---|
| | ½ | 1 | 2 |
| 6 | 1.6 | 1.6 | 3.2 |
| 12 | 2.4 | 3.2 | 5.6 |
| 24 | 6.4 | 7.2 | 17.6 |
| 36 | 18.4 | 19.2 | 31.2 |
| 42 | | | 39.2 |
| 48 | 23.2 | 24.8 | |
| 60 | 32.8 | 40.0 | |

TABLE IV

| Displacement Rate | Power Level | | |
|---|---|---|---|
| | ½ | 1 | 2 |
| 12 | 8.8 | 8.8 | 12.0 |
| 24 | 16.0 | 16.0 | 28.0 |
| 30 | 24.8 | 21.6 | 32.0 |
| 36 | 26.4 | 26.4 | 41.6 |
| 48 | 32.0 | 35.2 | |
| 60 | 40.0 | | |

It will be noted from tables I, III and IV that the power level required to fracture a given substrate tends to increase with an increase in the rate of displacement and with an increase in the width of the substrate. As the rate of displacement determines the total amount of energy which is applied to a given area of a substrate within a given interval of time, it is thought that an increase in the displacement rate reduces the amount of rate which is applied to a given area of the substrate and that the power level of the beam must be increased so that sufficient energy is applied to effect the desired results. It is also thought that as the substrate width is increased there is greater resistance to the localized expansion of the substrate required to effect a fracture and that the power level must be increased to overcome this increased resistance. The amount of energy which the substrate absorbs and dissipates may also increase with increased width so that higher power levels are required.

It will also be noted from table II that the power level required to fracture the substrate increases with increased substrate thickness. This is thought to occur primarily due to the increased strength of the substrate due to the increase in substrate thickness, but may also be contributed to by an increased ability of the substrate to absorb and dissipate energy It is noted, however, than an increase in the length of the substrate does not appreciably affect the power level required to fracture the substrate.

It is observed that by supporting the substrate 16 on knife edges 44-44, the power level required to fracture the substrate is also reduced. This is thought to occur because the amount of energy the substrate can transfer to carriage 18 by conduction is substantially reduced when the substrate is spaced away from the carriage. Each of the examples given in the tables were spaced from the carriage 18 in this manner.

It is also observed that in employing this method to separate glass substrates, surface damage to the substrate may be appreciably reduced by focusing the laser beam to a line. If surface damage to a substrate is experienced, defocusing of the beam of focusing of the beam to a line is a advantageous technique to employ to reduce such damage particularly where it is undesirable to reduce the displacement rate so as to permit a reduction in the power level.

As will be appreciated, the method of this invention permits the controlled separation of a substrate without the necessity of either directly contacting the substrate or subsequently stressing the substrate to effect separation. In addition, such controlled separation may be accomplished without deleterious damage to the substrate or to circuits and/or components thereon. Also, as the substrates may be supported by knife edges 44—44, it is possible in some instances to turn the substrates 16 over with the circuits and/or components such as circuits 42 and 43 facing toward the carriage 18 without damaging the circuits and/or components. This permits relatively high-power levels to be employed without undue concern for vaporization when relatively high-displacement rates are desired.

The method of this invention may be employed to separate many different types of material. For example, quartz, sapphire and silicon have also been successfully separated. A 0.032 inch thick by twenty-three sixty-fourths inch wide by 1 inch long quartz substrate may be separated in the same manner described above by applying the laser beam 12 to the quartz substrate at a power level of 9.6 watts when the substrate is displaced at a rate of 60 inches per minute. A 0.048 inch thick by seventeen thirty-seconds inch wide by 1 inch long sapphire substrate may be separated in the same manner described above by applying the laser beam at a power level of 12 watts when the substrate is displaced at a rate of 3 inches per minute. A 0.006 inch thick circular slice of silicon having a diameter of 1.25 inches may be separated in the manner disclosed above by applying the laser beam at a power level of 24 watts when the substrate is displaced at a rate of 24 inches per minute.

As will be appreciated by one skilled in the art, many variations and changes may be made without departing from the spirit of the invention. For example, it may be desirable to apply more than one laser beam to a substrate or to apply a laser beam simultaneously to opposite sides of a substrate.

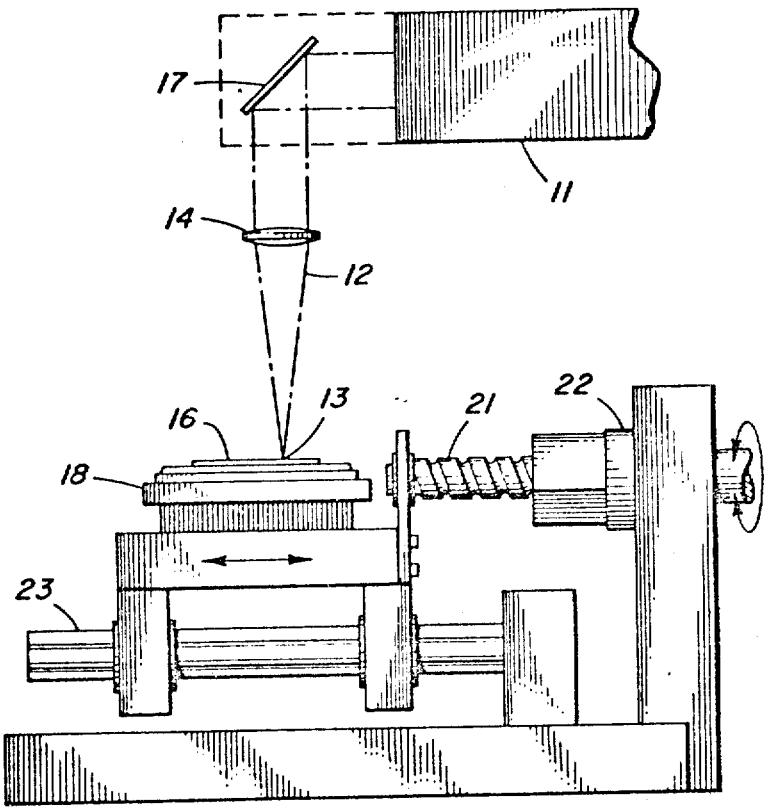

What is claimed is:

1. A method for parting a substrate, comprising the steps of:
   applying a laser beam to the substrate to generate a localized fracture through said substrate, and
   displacing said laser beam relative to said substrate along a desired path to propagate, said localized fracture along said path of said beam to part said substrate along said path the intensity of said beam and the speed of displacement being so controlled that fracture is effected without reliance upon vaporization to generate said fracture.
2. The method of claim 1 wherein said substrate is ceramic.
3. The method of claim 1 wherein said substrate is alumina.
4. The method of claim 1 wherein said substrate is glass.
5. The method of claim 1 wherein said substrate is sapphire.
6. A method for separating a first portion of a substrate from a second portion of the substrate, comprising the steps of:
   applying a focused laser beam to a point on a line which divides said first portion of said substrate from said second portion, said laser beam being applied at a power level sufficient to generate a fracture entirely through said substrate at said point of application, said fracture being substantially restricted in area to said point of application; and
   displacing said laser beam along said line to propagate said fracture along said line to separate said first and second portions of said substrate the intensity of said beam and the speed of displacement being so controlled that fracture is effected without reliance upon vaporization to generate said fracture.

7. The method of claim 6 wherein said substrate is positioned at the focal point of said laser beam.

8. The method of claim 7 wherein said substrate is sapphire.

9. The method of claim 7 wherein said substrate is alumina.

10. The method of claim 6 wherein said substrate is positioned a fixed distance away from the focal point of said laser.

11 The method of claim 6 wherein said laser beam is focused to a line.

12. The method of claim 11 wherein said substrate is glass.

13. A method of partitioning an alumina substrate having a planar surface supporting a plurality of individual circuits thereon, which comprises the steps of:
applying a laser beam to said planar surface on a section of a predetermined line of partition of said substrate between said individual circuits with sufficient power level to fracture the substrate through said section, said laser beam being applied for sufficient duration and being of sufficient magnitude to heat only a portion of the substrate extending from the top surface to impart a thermal shock of sufficient magnitude to the remaining portion of said substrate to fracture through said substrate without fracturing across the substrate, and
displacing said substrate relative to said laser beam along said line of partition to separate the substrate along the path of said relative movement the intensity of said beam and the speed of displacement being so controlled that fracture is effected without reliance upon vaporization to generate said fracture.

14. A method of dividing a substrate constructed of material fracturable by application of a laser beam, which comprises:
applying a laser beam on a section of the surface of said substrate at a sufficient power level to extend a local fracture through said section an the underlying substrate but not across the remainder of said substrate, and
displacing said laser beam relative to said substrate to extend the fracture across the remainder of the substrate in a path determined by the path of said relative movement the intensity of said beam and the speed of displacement being so controlled that fracture is effected without reliance upon vaporization to generate said fracture.

* * * * *

UNITED STATES PATENT OFFICE
CERTIFICATE OF CORRECTION

Patent No. 3,629,545　　　　　　　　Dated December 21, 1971

Inventor(s) C. E. Graham, R.M. Lumley, D.J. Oberholzer

It is certified that error appears in the above-identified patent and that said Letters Patent are hereby corrected as shown below:

In the specification, Column 1, lines 49-50 "along the scored line. Anyone" should read -- along a desired line and then to stress the glass to fracture the glass along the scored line. Anyone -- . Column 2, line 4 "desire" should read -- desired -- ; line 11 "does always" should read -- does not always -- ; line 46, line 47, line 49, line 51, and line 62 "radiofrequency" should read -- radio-frequency -- . Column 4, line 29 "approximately" should read -- appropriately -- . Column 6, line 43 "3-1/2 inches" should read -- 3-3/4 inches -- ; lines 53-55 "The examples given in Table IV are for 0.062 inch thick by 3 inches long glass substrates which vary in width by 1/2 inch to 2 inches." (second occurrence) should be deleted. Column 7, lines 67-68 "energy It" should read -- energy. It -- ; line 68 "than" should read -- that -- . Column 8, line 7 "beam of" should read -- beam or -- ; line 8 "a advantageous" should read -- an advantageous -- .

In the claims, claim 1, column 8, line 54 "propagate," should read -- propagate -- .

Cancel the illustrative drawing on the cover sheet and substitute the drawing on the attached sheet.

Signed and sealed this 26th day of December 1972.

(SEAL)
Attest:

EDWARD M. FLETCHER, JR.　　　　　　ROBERT GOTTSCHALK
Attesting Officer　　　　　　　　　　Commissioner of Patents

UNITED STATES PATENT OFFICE
CERTIFICATE OF CORRECTION

Patent No. 3,629,545                  Dated December 21, 1971

Inventor(s) Charles Eckner Graham et al.            - 2 -

It is certified that error appears in the above-identified patent and that said Letters Patent are hereby corrected as shown below: